United States Patent [19]

Shiraishi et al.

[11] 3,928,462
[45] Dec. 23, 1975

[54] CATALYTIC PROCESS FOR THE PREPARATION OF METHACROLEIN

[75] Inventors: Tatsuo Shiraishi; Susumu Kishiwada; Shinkichi Shimizu; Shigeru Honmaru; Hiroshi Ichihashi; Yoshihiko Nagaoka, all of Niihama, Japan

[73] Assignee: Sumitomo Chemical Company, Limited, Japan

[22] Filed: July 2, 1971

[21] Appl. No.: 159,307

[52] U.S. Cl. ...... 260/604 R; 260/533 N; 260/593 R
[51] Int. Cl.² .......................................... C07C 45/04
[58] Field of Search .................................. 260/604 R

[56] References Cited
UNITED STATES PATENTS

| | | | |
|---|---|---|---|
| 3,546,138 | 12/1970 | Callahan et al. | 260/604 R |
| 3,639,269 | 2/1972 | Koberstein et al. | 260/604 R |
| 3,642,930 | 2/1972 | Grasselli et al. | 260/604 R |
| 3,679,608 | 7/1972 | Garnish et al. | 260/604 R |

FOREIGN PATENTS OR APPLICATIONS

| | | | |
|---|---|---|---|
| 965,200 | 7/1964 | United Kingdom | 260/604 R |
| 1,501,549 | 10/1967 | France | 260/604 R |

Primary Examiner—James O. Thomas, Jr.
Assistant Examiner—R. H. Liles
Attorney, Agent, or Firm—Stewart and Kolasch, Ltd.

[57] ABSTRACT

A process for the preparation of methacrolein by the vapor phase oxidation of isobutylene which comprises contacting isobutylene and oxygen with a catalyst composition comprising a catalyst system of the formula: $Mo_aBi_bFe_cNi_dTl_eX_fP_gO_h$ wherein X is one or more of Mn, Mg and Co and $a$, $b$, $c$, $d$, $e$, $f$, $g$ and $h$ represent respectively the number of atoms, wherein $a$ is 12, $b$ is 0.1 to 5, $c$ is 0.1 to 5, $d$ is 0.1 to 12, $e$ is 1 or less but not 0, $f$ is 0 to 12, $g$ is 0 to 5 and $h$ is from 36 to 89. By such process, methacrolein is produced in a high selectivity and an excellent yield per each pass even at a large space velocity.

19 Claims, 4 Drawing Figures

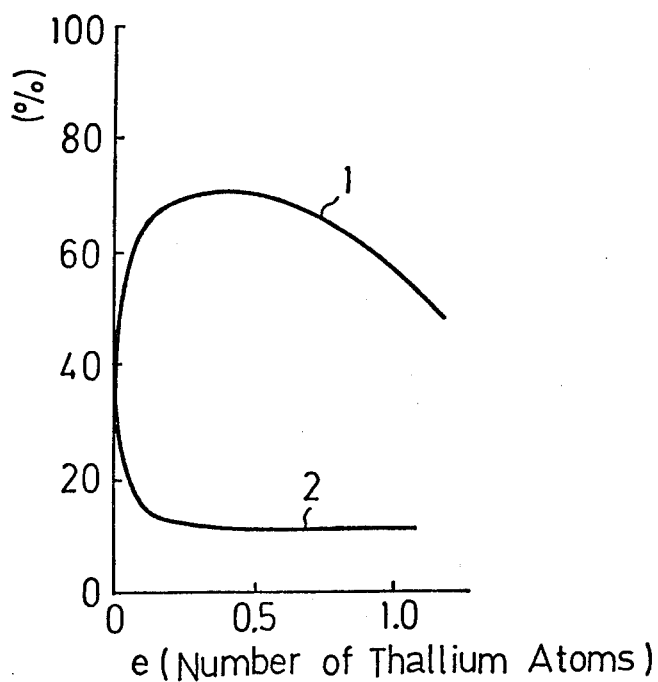

CATALYTIC PROCESS FOR THE PREPARATION OF METHACROLEIN

The present invention relates to a method for producing methacrolein. More particularly, it relates to a method for selective production of methacrolein by the vapor phase oxidation of isobutylene in the presence of a specific catalyst system.

For the production of unsaturated aldehydes by the vapor phase oxidation of olefins, there have been proposed a variety of catalyst systems, of which a typical one is a composition comprising the oxides of molybdenum, bismuth, phosphorus, iron and one or more of nickel and cobalt. For instance, Japanese Patent Publication No. 2324/1968 discloses the oxidation of isobutylene using a catalyst system comprising molybdenum, bismuth, iron, nickel, phosphorus and oxygen. When the oxidation is effected using such catalyst system, the conversion of isobutylene is quite excellent, i.e. about 96 %. But, the selectivity to methacrolein is low and by-products such as carbon oxides are formed in large amounts. That is, the yield of methacrolein on the basis of the reacted isobutylene is 37 %, the yield in each pass of feed isobutylene is 35 % and carbon dioxide and carbon monoxide are produced respectively in yields of 19.9 % and 10.0 % with respect to the feed isobutylene. The space time yield of methacrolein calculated from the obtained results is only 6.35 g/l liter of the catalyst/l hour. Further, for instance, U.S. Pat. No. 3454630 proposes the use of a catalyst system comprising molybdenum, bismuth, iron, nickel, cobalt, phosphorus and oxygen in the oxidation of isobutylene. In such method, the conversion of isobutylene is 96 %, but the selectivity to methacrolein is only 37 % and that to methacrylic acid is 21 %. As to carbon oxides, there is no description, but it is likely from the carbon atom balance that the selectivity to them is 30 % or more. As noted in these prior art references, conventional catalyst systems can realize a high conversion of the starting olefin at an elevated temperature and even at a large space velocity but afford the desired unsaturated aldehyde in a considerably low selectivity. Although a high one pass yield to the unsaturated aldehyde can be attained at a relatively lower temperature by lowering the space velocity, the space time yield of the unsaturated aldehyde in that case is low. Further, the use of conventional catalyst systems results in the by-production of carbon oxides in large amounts, by which the starting olefin and oxygen are wasted. Since the side reactions producing carbon oxides are more exothermic than the main reaction, the control of heat becomes difficult and a large amount of a diluent is required for such control. Thus, the appearance of a catalyst system which can reveal a high catalytic activity and afford a good conversion and selectivity to the objective unsaturated aldehyde even at a large space velocity has been desired for a long time.

As the result of extensive studies, it has been found that the use of a specific catalyst system comprising thallium in the vapor phase oxidation of isobutylene can afford methacrolein with a high selectivity in an excellent yield per each pass.

According to the present invention, there is provided a method for producing methacrolein which comprises subjecting isobutylene to vapor phase oxidation in the presence of a catalyst system corresponding to the formula:

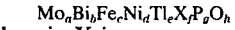

wherein X is one or more of Mn, Mg and Co and $a$, $b$, $c$, $d$, $e$, $f$, $g$ and $h$ represent respectively the number of atoms, provided that, when $a$ is 12, $b$ is 0.1 to 5 (preferably 0.5 to 3), $c$ is 0.1 to 5 (preferably 0.5 to 5), $d$ is 0.1 to 12 (preferably 1.5 to 12), $e$ is 1 or less but not 0 (preferably 0.01 to 0.7), $f$ is 0 to 12 (preferably 0 to 9.0), $g$ is 0 to 5 (preferably 0.01 to 2) and $h$ is decided depending on the number of the other atoms and is from 36 to 89 (preferably 39 to 75).

The catalyst system of the present invention is characterized by containing thallium therein, and the catalytic activity is considerably varied with the content of thallium. The graph in the attached drawing shows the relationship of the selectivities (%) to methacrolein (curve 1) and to carbon oxides (curve 2) with the content of thallium ($e$) in the catalyst system corresponding to the formula:

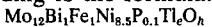

wherein $h$ is $(95.5 + 3e)/2$ in the oxidation of isobutylene. From the graph, it is understood that, when the content of thallium ($e$) is less than 1.0, the selectivity to methacrolein is large, and that to carbon oxides is about one third in comparison with a catalyst system not containing thallium. On the other hand, when a suitable amount of thallium is present, i.e., the content of thallium is one or less, but not zero, the formation rate of methacrolein is large. Considering these facts, it is likely that thallium is present in the catalyst system not as a mere oxide but as a specific compound, which makes a great contribution to the exertion of the catalytic activity.

The starting materials in the vapor phase oxidation of this invention are isobutylene and oxygen. The isobutylene is not necessarily required to be highly pure and may contain, for instance, some amounts of low molecular weight saturated and unsaturated hydrocarbons such as butane and propylene. When unsaturated hydrocarbons are contained, therein the corresponding unsaturated aldehydes such as acrolein are formed during the reaction, but these by-products do not exert any appreciable influence upon the reaction. As the oxygen source, there may be used pure oxygen gas, air enhanced or not in oxygen concentration or any other oxygen-containing gas. From the economical viewpoint, the use of air is preferred. As the case may be, steam is introduced into the reaction system. If desired, an appropriate inert gas such as nitrogen, carbon dioxide or argon may be used as a diluent.

For preparation of the catalyst system, there may be employed molybdenum compounds (e.g. ammonium molybdate, molybdenum oxide, molybdic acid, phosphomolybdic acid), phosphorus compounds (e.g. phosphoric acid, ammonium phosphate, phosphorus pentoxide), metallic thallium and thallium compounds (e.g. thallium nitrate, thallium carbonate, thallium chloride), bismuth salts (e.g. bismuth nitrate, bismuth chloride), iron salts (e.g. ferric nitrate, ferric chloride), nickel salts (e.g. nickel nitrate, nickel chloride), manganese salts (e.g. manganese nitrate, manganese chloride), magnesium salts (e.g. magnesium nitrate, magnesium chloride), and cobalt salts (e.g. cobalt nitrate, cobalt chloride).

The catalyst system may be used as such but is favorably incorporated with a suitable carrier (e.g. silica, alumina, silicon carbide, titanium oxide). The amount of the carrier is varied with its kind and may be usually less than 90 % by weight, preferably from 5 to 90 % by weight, of the catalyst composition.

The preparation of the catalyst composition may be executed by a per se conventional procedure. For instance, a thallium salt, an iron salt, a bismuth salt, a phosphorus compound, a nickel salt and one or more of a manganese salt, a magnesium salt and a cobalt salt are added to an aqueous solution of a molybdate such as ammonium molybdate, the resulting slurry is admixed with a carrier material and evaporated to dryness, and the resultant cake is calcined at an elevated temperature in the atmosphere, i.e. air and, after cooling, crushed and shaped into pellets or granules.

The production of methacrolein using the catalyst composition of the invention may be effected by a fluidized bed process or a fixed bed process. The particle size of the catalyst composition is not particularly limited and may be optionally varied with the type of its use. The reaction temperature is associated with the kind of the catalyst composition and is usually from 250° to 500°C, preferably from 300° to 450°C. The reaction pressure may be usually from 0.5 to 10 absolute atmospheres. The molar ratio of the starting materials may be isobutylene : oxygen = 1.0 : 0.5 – 6 (favorably 1.0 – 4.0). When steam is used, it may be usually not more than 15 mol per 1 mol of isobutylene. The space velocity is ordinarily from 100 to 12,000 hr$^{-1}$, preferably from 300 to 16,000 hr$^{-1}$.

By the use of the catalyst system of the present invention, methacrolein can be produced with a high selectivity in an excellent yield per each pass even at a large space velocity, and the formation of by-products such as carbon oxides is considerably suppressed. Further, the space time yield of methacrolein is high, showing an excellent productivity of the catalyst system. In addition, the life of the catalytic activity is sufficiently and satisfactorily long, and the thallium in the catalyst composition is never volatilized during the reaction.

Practical and presently preferred embodiments of the present invention are illustratively shown in the following examples, wherein the conversion of isobutylene and the selectivity to the product are calculated respectively according to the equations:

$$\text{Conversion of isobutylene (\%)} = \frac{\text{Reacted isobutylene (mol)}}{\text{Feed isobutylene (mol)}} \times 100$$

$$\text{Selectivity (\%)} = \frac{\text{Weight of carbon atoms in product}}{\text{Weight of carbon atoms in reacted isobutylene}} \times 100$$

EXAMPLE 1

A solution of bismuth nitrate (12.13 g) in a mixture of concentrated nitric acid (4 ml) and water (30 ml) and a solution of ferric nitrate (10.10 g), nickel nitrate (39.99 g), magnesium nitrate (6.41 g), cobalt nitrate (7.28 g), manganese nitrate (7.18 g) and thallium nitrate (2.66 g) in water (250 ml) are combined together. To the resultant mixture, a solution of ammonium molybdate (52.98 g) and concentrated phosphoric acid (85 % by weight; 0.29 g) in a mixture of aqueous ammonia (28 % by weight; 30 ml) and water (300 ml) is added, and the mixture is stirred well to make a dispersion. Then, silica sol (SiO$_2$, 20 % by weight; 100 ml) is added thereto under vigorous stirring. The resultant dispersion is evaporated to dryness, and the residue is calcined at 300°C for 3 hours (1st calcination), cooled and crushed. The obtained powder is tableted and calcined at 525°C for 6 hours in the atmosphere, i.e. air (2nd calcination) to give a catalyst composition, of which the active components correspond to the formula: $Mo_{12}Bi_1Fe_1Ni_{5.5}Tl_{0.4}Mn_1\ Mg_1Co_1P_{0.1}O_{48.3}$.

In a glass-made reaction tube of 10 mm in inner diameter, the catalyst composition as obtained above and crushed in grains of 10 to 16 mesh (1.00 to 1.68 mm in particle size) (3.0 ml) is charged and heated up to 350°C. Then, a gaseous mixture of isobutylene, air and steam (1:15:8 in molar ratio) is introduced into the reaction tube at a space velocity of 1420 hr$^{-1}$, whereby methacrolein is produced. The conversion of isobutylene is 85 % and the selectivities to methacrolein, carbon monoxide and carbon dioxide are respectively 70 %, 4.0 % and 8.5 %. The space time yield of methacrolein is 110 g/1 liter of the catalyst/1 hour. Small amounts of other compounds such as acrolein, acetone and methacrylic acid are also produced.

EXAMPLE 2 TO 20

As in Example 1, catalyst compositions are prepared and the oxidation reaction using them is carried out. The results are shown in Table 1.

Table 1

| Ex. No. | Mo | Bi | Fe | Ni | Tl | Mn | Mg | Co | P | O |
|---|---|---|---|---|---|---|---|---|---|---|
| 2 | 12 | 1 | 1 | 8.5 | 0.4 | 0 | 0 | 0 | 0.1 | 48.3 |
| 3 | 12 | 1 | 1 | 8.5 | 0.3 | 0 | 0 | 0 | 0.1 | 48.2 |
| 4 | 12 | 1 | 1 | 8.5 | 0.5 | 0 | 0 | 0 | 0.1 | 48.5 |
| 5 | 12 | 1 | 1 | 8.5 | 0.4 | 0 | 0 | 0 | 0 | 48.1 |
| 6 | 12 | 1 | 1 | 8.5 | 0.4 | 0 | 0 | 0 | 1 | 50.6 |
| 7 | 12 | 1 | 1 | 7.5 | 0.5 | 1 | 0 | 0 | 0.1 | 48.5 |
| 8 | 12 | 1 | 1 | 4.5 | 0.3 | 4 | 0 | 0 | 0.1 | 48.2 |
| 9 | 12 | 1 | 1 | 8 | 0.3 | 0.5 | 0 | 0 | 0.1 | 48.2 |
| 10 | 12 | 1 | 1 | 6.5 | 0.4 | 0 | 2 | 0 | 0.1 | 48.3 |
| 11 | 12 | 1 | 1 | 4.5 | 0.4 | 0 | 4 | 0 | 0.1 | 48.3 |
| 12 | 12 | 1 | 1 | 4.5 | 0.4 | 0 | 0 | 4 | 0.1 | 48.3 |
| 13 | 12 | 1 | 1 | 4.5 | 0.5 | 0 | 0 | 4 | 0.1 | 48.5 |
| 14 | 12 | 1 | 0.5 | 4.5 | 0.5 | 0 | 0 | 4 | 0.1 | 47.7 |
| 15 | 12 | 1 | 3 | 4.5 | 0.4 | 0 | 0 | 0 | 0.1 | 47.3 |
| 16 | 12 | 1 | 1 | 5.5 | 0.4 | 0.5 | 0.5 | 2.5 | 0.1 | 48.8 |
| 17 | 12 | 1 | 1 | 5.5 | 0.4 | 0 | 1.5 | 1.5 | 0.1 | 48.3 |
| 18 | 12 | 1 | 1 | 5.5 | 0.4 | 0.5 | 2.5 | 0 | 0.1 | 48.3 |
| 19 | 12 | 1 | 1 | 5.5 | 0.4 | 0.5 | 0 | 2.5 | 0.1 | 48.3 |
| 20 | 12 | 1 | 1 | 5.5 | 0.4 | 0 | 1.5 | 1.5 | 0 | 48.1 |

Table 1-continued

| Ex. No. | 2nd calcined temp. (°C) | Reaction condition Reaction temp. (°C) | Space velocity (hr⁻¹) | Feed composition (molar ratio) Isobutylene | Air | Steam | Isobutylene per pass conversion (%) | Methacrolein | Selectivity (%) CO | CO$_2$ | Methacrolein space time yield (g/l/hr) |
|---|---|---|---|---|---|---|---|---|---|---|---|
| 2  | 550 | 360 | 1430 | 1 | 15 | 8  | 98  | 69 | 5.2 | 7.7  | 126 |
| 3  | 550 | 380 | 3240 | 1 | 15 | 8  | 97  | 69 | 5.1 | 7.5  | 283 |
| 4  | 550 | 360 | 1440 | 1 | 14 | 8  | 94  | 73 | 6.4 | 6.9  | 134 |
| 5  | 550 | 340 | 1450 | 1 | 15 | 15 | 93  | 76 | 4.2 | 5.1  | 103 |
| 6  | 550 | 360 | 1490 | 1 | 15 | 15 | 100 | 53 | 9.0 | 15.8 | 80  |
| 7  | 550 | 340 | 1420 | 1 | 15 | 8  | 98  | 69 | 4.1 | 6.0  | 125 |
| 8  | 525 | 360 | 2180 | 1 | 15 | 8  | 91  | 67 | 6.0 | 9.6  | 173 |
| 9  | 525 | 360 | 2260 | 1 | 15 | 8  | 100 | 68 | 5.7 | 9.1  | 200 |
| 10 | 525 | 360 | 3000 | 1 | 12 | 8  | 96  | 66 | 4.1 | 7.2  | 283 |
| 11 | 525 | 340 | 1420 | 1 | 15 | 8  | 63  | 71 | 4.6 | 11.3 | 83  |
| 12 | 550 | 340 | 1470 | 1 | 15 | 8  | 96  | 73 | 3.9 | 6.9  | 134 |
| 13 | 550 | 360 | 1570 | 1 | 11 | 8  | 97  | 51 | 7.6 | 8.5  | 145 |
| 14 | 525 | 360 | 1420 | 1 | 15 | 15 | 100 | 69 | 6.0 | 9.0  | 99  |
| 15 | 550 | 360 | 1420 | 1 | 15 | 15 | 97  | 60 | 8.3 | 10.1 | 83  |
| 16 | 525 | 360 | 1400 | 1 | 15 | 8  | 86  | 64 | 6.6 | 7.8  | 100 |
| 17 | 525 | 360 | 1460 | 1 | 15 | 8  | 95  | 73 | 4.0 | 6.1  | 132 |
| 18 | 525 | 360 | 1410 | 1 | 15 | 8  | 89  | 65 | 5.4 | 6.2  | 106 |
| 19 | 525 | 360 | 1360 | 1 | 15 | 8  | 97  | 69 | 5.4 | 7.7  | 118 |
| 20 | 525 | 360 | 1380 | 1 | 15 | 8  | 92  | 67 | 4.6 | 6.7  | 111 |

REFERENCE EXAMPLES 1 TO 5

As in Example 1 but not using thallium nitrate, catalyst compositions are prepared and the oxidation reaction using them is carried out. The results are shown in Table 2.

EXAMPLES 21 AND 22

Using the catalyst composition obtained as in Example 1, the oxidation reaction is carried out at 360°C at a Space velocity of 1490 hr⁻¹ in the presence or absence of steam. The results are shown in Table 3.

Table 2

| Ex. No. | Catalyst composition Mo | Bi | Fe | Ni | Mn | Mg | Co | P | O | 2nd calcined temp. (°C) | Reaction temp. (°C) | Space velocity (hr⁻¹) |
|---|---|---|---|---|---|---|---|---|---|---|---|---|
| 1 | 12 | 1 | 1 | 8.5 | 0 | 0 | 0 | 0.1 | 47.7 | 550 | 360 | 1420 |
| 2 | 12 | 1 | 1 | 7.5 | 1 | 0 | 0 | 0.1 | 47.7 | 550 | 360 | 1440 |
| 3 | 12 | 1 | 1 | 4.5 | 0 | 4 | 0 | 0.1 | 47.7 | 525 | 360 | 1420 |
| 4 | 12 | 1 | 1 | 4.5 | 0 | 0 | 4 | 0.1 | 47.7 | 550 | 360 | 670  |
| 5 | 12 | 1 | 1 | 5.5 | 1 | 1 | 1 | 0.1 | 47.7 | 525 | 350 | 1390 |

| Ex. No. | Feed composition (molar ratio) Isobutylene | Air | Steam | Isobutylene per pass conversion (%) | Selectivity (%) Methacrolein | CO | CO$_2$ | Methacrolein space time yield (g/l/hr) |
|---|---|---|---|---|---|---|---|---|
| 1 | 1 | 15 | 8 | 97 | 38 | 9.4  | 20.4 | 68 |
| 2 | 1 | 15 | 8 | 49 | 33 | 7.2  | 23.8 | 30 |
| 3 | 1 | 15 | 8 | 40 | 39 | 12.3 | 33.8 | 29 |
| 4 | 1 | 15 | 8 | 98 | 28 | 17.0 | 29.0 | 24 |
| 5 | 1 | 15 | 8 | 21 | 28 | 14.1 | 26.8 | 11 |

Table 3

| Example No. | Catalyst composition | Feed composition (molar ratio) Isobutylene | O$_2$ | Steam | N$_2$ | Isobutylene per pass conversion (%) | Selectivity (%) Methacrolein | CO | CO$_2$ |
|---|---|---|---|---|---|---|---|---|---|
| 21 | Mo$_{12}$Bi$_1$Fe$_1$Ni$_{4.5}$Tl$_{0.6}$Co$_4$P$_{0.1}$O$_{48.6}$ | 1 | 3 | 0  | 27 | 99 | 79 | 4.2 | 8.2 |
| 22 | Mo$_{12}$Bi$_1$Fe$_1$Ni$_{4.5}$Tl$_{0.6}$Co$_4$P$_{0.1}$O$_{48.6}$ | 1 | 3 | 15 | 12 | 99 | 68 | 5.7 | 6.8 |

REFERENCE EXAMPLES 6 AND 7

As in Examples 21 and 22, the oxidation is carried out using the catalyst composition obtained in Reference Example 4. The results are shown in Table 4.

Table 4

| Example No. | Catalyst composition | Feed composition (molar ratio) | | | | Isobutylene per-pass conversion (%) | Selectivity (%) | | |
|---|---|---|---|---|---|---|---|---|---|
| | | Isobutylene | $O_2$ | steam | $N_2$ | | Methacrolein | CO | $CO_2$ |
| 6 | $Mo_{12}Bi_1Fe_1Ni_{4.5}Co_4P_{0.1}O_{47.7}$ | 1 | 3 | 0 | 27 | 51 | 22 | 17.5 | 51.6 |
| 7 | $Mo_{12}Bi_1Fe_1Ni_{4.5}Co_4P_{0.1}O_{47.7}$ | 1 | 3 | 15 | 12 | 83 | 43 | 6.6 | 19.8 |

What is claimed is:

1. A process for the preparation of methacrolein by the vapor phase oxidation of isobutylene which comprises contacting isobutylene and oxygen at a temperature from 250° to 500°C. with a catalyst composition consisting essentially of a catalyst system of the formula:

$$Mo_a Bi_b Fe_c Ni_d Tl_e X_f P_g O_h$$

wherein X is Mn, Mg or Co or a combination thereof and $a, b, c, d, e, f, g$ and $h$ represent respectively the number of atoms wherein $a$ is 12, $b$ is 0.1 to 5, $c$ is 0.1 to 5, $d$ is 0.1 to 12, $e$ is 1 or less but not 0, $f$ is 0 to 12, $g$ is 0 to 5 and $h$ is from 36 to 89.

2. The process according to claim 1, wherein $a$ is 12, $b$ is 0.5 to 3, $c$ is 0.5 to 5, $d$ is 1.5 to 12, $e$ is 0.01 to 0.7, $f$ is 0 to 9.0, $g$ is 0.01 to 2 and $h$ is 39 to 75.

3. The process according to claim 1, wherein, $d$ plus $f$ is 2 to 15.

4. The process according to claim 1, wherein the molar ratio of the starting materials is isobutylene : oxygen = 1.0 : 0.5 to 6.

5. The process according to claim 1, wherein the molar ratio of the starting materials is isobutylene : oxygen = 1.0 : 1.0 to 4.0.

6. The process according to claim 1, wherein the contact is effected at a temperature from 300° to 450°C.

7. The process according to claim 1, wherein the contact is effected at a space velocity of 100 to 12,000 hr$^{-1}$.

8. The process according to claim 1, wherein the contact is effected at a space velocity of 300 to 6000 hr$^{-1}$.

9. The process according to claim 1, wherein the contact is effected under a pressure of 0.5 to 10 absolute atmosphere.

10. The process according to claim 1, wherein the contact is effected in the presence of steam.

11. The process according to claim 10, wherein the steam is employed in a rate of not more than 15 mol per 1 mol of isobutylene.

12. The process according to claim 1, wherein air enhanced oxygen concentration is employed as the oxygen source.

13. The process according to claim 1, wherein air is employed as the oxygen source.

14. The process according to claim 1, wherein the reaction is effected in the presence of a diluent selected from the group consisting of nitrogen, carbon dioxide and argon.

15. The process according to claim 1, wherein the catalyst composition is incorporated with a carrier selected from the group consisting of silica, alumina, silicon carbide and titanium oxide.

16. The process according to claim 15, wherein the amount of the carrier is less than 90 % by weight of the catalyst composition.

17. The process according to claim 16, wherein the amount of the carrier is from 5 to 90 % by weight of the catalyst composition.

18. A process for the preparation of methacrolein by the vapor phase oxidation of isobutylene which comprises contacting isobutylene and oxygen at a temperature from 250° to 500°C. and at a space velocity of 100 to 12,000 hr$^{-1}$ with a catalyst composition consisting essentially of a catalyst system of the formula:

$$Mo_a Bi_b Fe_c Ni_d Tl_e X_f P_g O_h$$

wherein X is Mn, Mg or Co or a combination thereof and $a, b, c, d, e, f, g$ and $h$ represent respectively the number of atoms wherein $a$ is 12, $b$ is 0.5 to 3, $c$ is 0.5 to 5, $d$ is 1.5 to 12, $e$ is 0.01 to 0.7, $f$ is 0 to 9.0, $g$ is 0.01 to 2 and $h$ is 39 to 75.

19. The process according to claim 18, wherein the molar ratio of the starting materials is isobutylene : oxygen = 1.0 : 1.0 to 4.0.

* * * * *

UNITED STATES PATENT OFFICE
CERTIFICATE OF CORRECTION

Patent No. 3,928,462            Dated December 23, 1975

Inventor(s) Tatsuo SHIRAISHI et al

It is certified that error appears in the above-identified patent and that said Letters Patent are hereby corrected as shown below:

IN THE TITLE PAGE:

After "Appl. No.: 159,307" please insert the following Foreign Application Priority Data:

--July 8, 1970     Japan....................60043/1970

July 8, 1970     Japan....................60044/1970

July 17, 1970     Japan....................63089/1970

July 17, 1970     Japan....................63090/1970

Aug. 18, 1970     Japan....................72642/1970--

Signed and Sealed this twentieth Day of April 1976

[SEAL]

Attest:

RUTH C. MASON
*Attesting Officer*

C. MARSHALL DANN
*Commissioner of Patents and Trademarks*